Patented Dec. 2, 1930

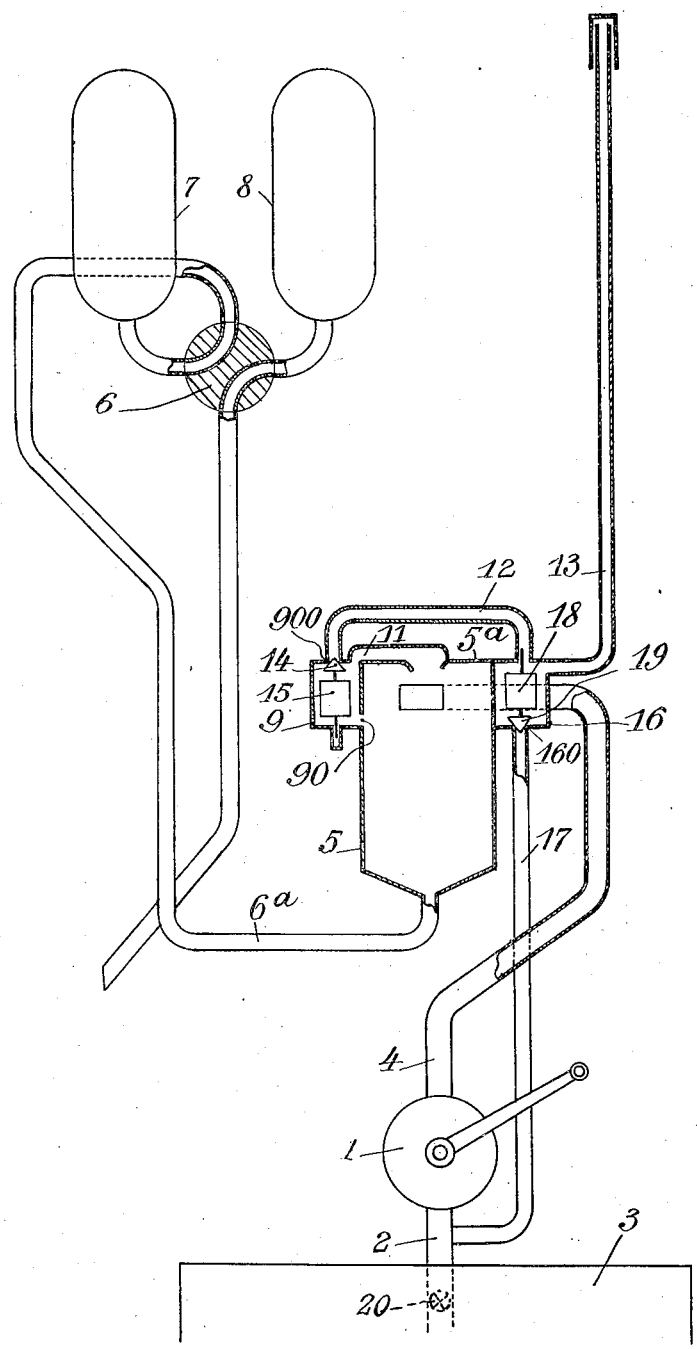

1,783,510

UNITED STATES PATENT OFFICE

ALFRED LANSER, OF CORSEAUX-VEVEY, SWITZERLAND

LIQUID-MEASURING APPARATUS

REISSUED

Application filed November 16, 1928, Serial No. 319,759, and in France November 2, 1928.

The present invention relates to liquid measuring apparatus, and more particularly, to those of the type designed for use with gasoline, oil, or the like.

One of the objects of the invention is to provide means for separating the gases contained in the liquid to be measured and additional means for recovering the liquid carried off by the separated gases or forced into the vent conduit by back pressure.

Other objects will appear in the course of the detailed description now to be given with reference to the accompanying drawing in which the single figure represents, diagrammatically one constructive embodiment of the invention.

Referring to the drawing, there is shown a pump 1 whose intake conduit 2 is connected to a supply tank 3,—a pump discharge conduit 4 connected tangentially to the upper part of a gas separator 5 which latter delivers through a central discharge conduit $6^a$ to a 4-way valve 6 controlling the feed to and the discharge from a pair of calibrated measuring reservoirs 7, 8 positioned above the level of 5,—a float chamber 9 communicating through a passage $9^o$ with the liquid in separator 5,—a gas discharge conduit 11 located at the top of chamber 5 and communicating with a recovery conduit 12 through a passage $9^{oo}$ controlled by float 15 and needle valve 14,—a vent conduit 13 in circuit with recovery conduit 12,—a recovery chamber 16 interposed between conduits 12 and 13 and provided with a float 18,—and a return conduit 17 communicating at 19 with chamber 16 and at its other extremity with conduit 2, orifice 19 being controlled by a needle valve $16^o$ connected to float 18. The vent conduit 13 arranged in substantially vertical relation as shown constitutes a stand pipe in which the liquids are deposited from gases passing therethrough from the gas discharge port $9^{oo}$.

The apparatus functions as follows: Liquid to be measured is pumped by pump 1 via conduits 2 and 4 into separator 5 where the vortexial movement of the liquid passing from 4 to $6^a$ separates the contained gases which discharge via conduit 11 past valve 14 into conduits 12, 13; when the apparatus is not being operated, the liquid in conduit $6^a$ produces a back pressure in separator 5 tending to force the liquid contained in the latter past valve 14, a valve 20 interposed between elements 2 and 3 preventing a siphoning effect into the supply reservoir; since valve 14 is rarely entirely leak-proof, the liquid forced into conduit 12 has hitherto been lost, but is now recovered via recovery chamber 16 and conduit return and 17.

What I claim is:—

1. An apparatus of the class described comprising a supply reservoir, a gas and liquid separator having a gas discharge port normally open to the atmosphere and a liquid discharge port, means for supplying liquid from said reservoir to said separator, a valve adapted to close said gas discharge port, means for recovering liquid passing said gas discharge port valve comprising a recovery chamber communicating with said gas discharge port, normally open to the atmosphere at its upper end and having a valve controlled liquid outlet at its lower end.

2. An apparatus of the class described comprising a supply reservoir, a gas and liquid separator having a gas discharge port and a liquid discharge port, means for passing liquid from said supply reservoir to said gas and liquid separator, a float controlled valve for controlling said gas discharge port, a liquid recovery chamber in communication with said gas discharge port, said liquid recovery chamber having at its upper end a conduit in communication with the atmosphere, a liquid discharge port at the bottom of said recovery chamber, a float controlling valve governing said liquid discharge port, and a conduit connecting said liquid discharge port with said supply reservoir.

3. An apparatus of the class described comprising a supply reservoir, a gas and liquid separator having a gas discharge port and a liquid discharge port, means for passing the liquid from the supply reservoir to said gas and liquid separator, a stand pipe for separating the liquid from the gas passing through said gas discharge port, said pipe communicating with the latter and with the atmosphere, a liquid recovery chamber communicating with said pipe, and float valve controlled means for returning the liquid from the chamber to the reservoir.

4. An apparatus of the class described comprising a supply reservoir, a gas and liquid separator having a gas discharge port and a liquid discharge port, means for passing the liquid from the supply reservoir to said gas and liquid separator, a stand pipe for separating the liquid from the gas passing through said gas discharge port, said pipe communicating with the latter and with the atmosphere, and a liquid recovery chamber communicating with said pipe.

ALFRED LANSER.